United States Patent [19]

Stice

[11] 4,421,101

[45] Dec. 20, 1983

[54] THERMAL ENERGY STORAGE SYSTEM

[75] Inventor: James D. Stice, Manchester, N.H.

[73] Assignee: Kalwall Corporation, Manchester, N.H.

[21] Appl. No.: 89,451

[22] Filed: Oct. 30, 1979

[51] Int. Cl.³ .......................... F24J 3/02; F28D 13/00
[52] U.S. Cl. .................................... 126/436; 126/400; 165/104.11
[58] Field of Search ............... 126/430, 400, 262, 375, 126/246; 165/DIG. 4, 104.5, 104.11 A, 104.17, 10

[56] References Cited

U.S. PATENT DOCUMENTS

| | | | |
|---|---|---|---|
| 2,903,550 | 9/1959 | Fritsche | 126/400 |
| 3,863,758 | 2/1975 | Connelly | 428/194 |
| 4,077,390 | 3/1978 | Stanley | 165/DIG. 4 |
| 4,205,656 | 6/1980 | Scarlata | 165/DIG. 4 |
| 4,290,416 | 9/1981 | Maloney | 126/431 |
| 4,338,917 | 7/1982 | Keller | 126/436 |

FOREIGN PATENT DOCUMENTS

| | | | |
|---|---|---|---|
| 2838922 | 3/1980 | Fed. Rep. of Germany | 126/431 |
| 7709979 | 3/1979 | Netherlands | 126/430 |

OTHER PUBLICATIONS

"Solar Energy-Fundamentals in Building Design", B. Anderson, 1977, pp. 102-105.

Primary Examiner—Samuel Scott
Assistant Examiner—G. Anderson
Attorney, Agent, or Firm—John E. Toupal; Harold G. Jarcho

[57] ABSTRACT

The invention is a sealed thermal energy storage container device including front and rear walls which together are partially absorptive and partially transmissive of visible light with a transmittance in the range between 4% and 85% and an absorptance of at least 9%. Retained within the container between the front and rear walls is an at least partially light transmissive energy storage substance that experiences a liquid-solid phase change between 45° F. and 190° F. After being strategically positioned for exposure to solar radiation, the energy storage substance accumulates a substantial quantity of energy when changed to a liquid state by incident sunlight and subsequently releases that energy when again freezing. In addition to sequentially and alternatively storing and releasing thermal energy, the container device transmits a predetermined level of incident sunlight. Furthermore, the partially absorptive walls are heated by sunlight and function as efficient sources of heating for the retained energy storage substance.

37 Claims, 8 Drawing Figures

THERMAL ENERGY STORAGE SYSTEM

BACKGROUND OF THE INVENTION

This invention relates generally to a passive solar energy storage system for use in conjunction with light transmitting glazing and, more specifically to a modular, phase-change material filled pod unit that can be assembled adjacent to glazing surfaces as partially light transmissive, thermal energy storing arrays.

Conventional building structures utilize various types of glazing to establish desired interior lighting levels. Typically, such glazing structures are thermally inefficient in that they transmit excessive levels of solar radiation to the building interior during certain time periods and provide an undesirably high rate of heat loss from the building during other time periods. Attempts to alleviate this problem with coated or tinted glass, double thicknesses of glass, isolating draperies, etc., offer partial solutions but leave much to be desired.

Previously proposed systems for increasing thermal energy efficiency have included materials that experience a liquid-solid phase change at temperatures substantially above that required to freeze water. When thawed by direct exposure to solar radiation, such materials can absorb a substantial quantity of thermal energy which can be subsequently released. Disclosures of such materials and systems in which they are used appear in the following U.S. Pat. Nos. 4,162,671 (Christy); 4,158,355 (Spitzer); 4,100,091 (Powell); 4,054,125 (Eckels); 4,003,426 (Best et al); 3,960,205 (Laing); 2,595,905 (Telkes) and the following publications: "Passive Solar Collector Wall Incorporating Phase Change", C. R. Hauer, R. V. Remillard, L. D. Nichols, 2nd. Passive Solar Conference, Philadelphia, PA, Mar. 17, 1978; "Passive Solar Energy Collector", C. R. Hauer, R. V. Remillard, L. D. Nichols, Final Report; EIKONIX Corporation, May 3, 1978; "Storage Configurations for Phase Change Materials", George A. Lane, Grey L. Warner, Philip B. Hartwick; Solar Engineering, August, 1979; "Solar Energy Storage", Maria Telkes, ASHRAE Journal, September, 1974. Although offering some advantages, prior phase-change material systems are less than satisfactory either individually or collectively because of numerous deficiencies such as increasing lighting energy costs by totally blocking sunlight, exhibiting poor heat transfer characteristics because of excessive reflection from crystals formed when the phase-change materials freeze, requiring costly custom designs in either geometry or material content, incorporation of materials, exhibiting thermal inefficiencies resulting from uneven and slow freezing and thawing of the phase-change material, etc.

The object of this invention, therefore, is to provide a more efficient, passive solar energy storage system for use in conjunction with the conventional glazing employed in building structures.

SUMMARY OF THE INVENTION

The invention is a sealed, thermal energy storage container device including front and rear walls which together are partially absorptive and partially transmissive of visible light with a transmittance in the range between 4% and 85% and an absorptance of at least 9%. Retained within the container between the front and rear walls is an at least partially light transmissive energy storage substance that experiences a liquid-solid phase change between 45° F. and 190° F. After being strategically positioned for exposure to solar radiation, the energy storage substance accumulates a substantial quantity of energy when changed to a liquid state by incident sunlight and subsequently releases that energy when again freezing. In addition to sequentially and alternatively storing and releasing thermal energy, the container device transmits a predetermined level of incident sunlight. Furthermore, the partially absorptive walls are heated by sunlight and function as efficient sources of heating for the retained energy storage substance.

In a featured embodiment of the invention, the container's front and rear walls are formed of flat sections of a rigid plastic material and have intersealed peripheral marginal portions that form a sealed interior filled with the energy storage substance. The rigid plastic walls experience deflective diaphragm action when filled with the energy storage substance and upon each change of state thereof. The overall container package is comparatively strong and inexpensive as well as conveniently self supporting.

According to another feature of the invention, the deflected front and back walls of the filled container are spaced apart by a maximum distance, d, in a central region of the interior and gradually taper inwardly to the sealed marginal portions. Featured parameters include an area between the sealed marginal portions having a square root between 14 and 20 times the maximum distance, d, a contained substance storage capacity of between 100–2000 British thermal units (Btu's) per square foot of the defined area, and slopes for the inwardly tapered front and rear walls that do not exceed 30 degrees.

Other featured parameters include a fiber reinforced, thermoset polyester wall material having a modulus of elasticity in flexure of between $0.75 \times 10^6$ psi and $1.25 \times 10^6$ psi, a maximum deflection distance, d, between front and rear walls of between 6 and 30 times the combined thickness thereof, and a thickness for each of the front and rear walls of between 0.020 and 0.070 inches. These parameters establish desired strength and diaphragm capability for the resultant container. Wall thicknesses less than 0.020 inches are susceptible to puncture by crystals of the frozen energy storage substance while wall thicknesses in excess of 0.070 inches are wasteful of material.

Other features of the invention include a rear wall with a visible light transmittance greater than that of the front wall and the use of walls formed with a plastic substrate of a given visible light transmittance and a light absorptive coating with a lesser visible light transmittance. The use of a preselected absorptive coating permits convenient selectivity of the container's overall visible light transmission absorption characteristics, while the use of a more absorptive front wall minimizes reflective losses for a unit of given overall light transmittance.

Still additional features of the invention are the use of an inorganic and therefore nonflammable energy storage substance and the provision of support openings in the container's sealed marginal portions. The support openings facilitate mounting of the container on support hooks adjacent the glazing of a building structure.

Also contemplated by the present invention is a thermal energy storage system including a glazing portion of an enclosure that defines an interior space and a thermal energy storage container means adjacent to and coextensive with the glazing portion so as to form therewith an intermediate space isolated from the interior space. The container means is preferably partially absorptive and partially transmissive of visible light and is filled with a partially light transmissive energy storage substance experiencing a liquid-solid phase change between 45° F. and 190° F. The storage substance accumulates substantial quantities of thermal energy when changed to a liquid state by incident sunlight transmitted through the glazing portion and subsequently supplies that energy to the interior space when changing to a solid state. Losses of the released energy to the outside are minimized by the dead air intermediate space between the container means and the glazing portion.

In a preferred embodiment of the above-described system, the container means comprises a stationary array of modular, individually detachable thermal energy storage units each comprising a sealed container filled with the energy storage substance. This embodiment is both inexpensive and easily assembled and defective individual storage units are easily replaced to restore maximum efficiency of the storage system.

In one embodiment of the invention, the individual units of the energy storage array are hung on support hooks mounted adjacent the glazing portion. Another embodiment includes a plurality of elongated, substantially horizontal and vertically spaced apart support members on each of which the bottom edges of a plurality of horizontally distributed units are supported.

In preferred forms of the above-described energy storage system, the individual energy storage units can include the features, parameters and characteristics of the previously described energy storage units. It is to be understood, however, that these various features can be utilized either independently or collaboratively.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENTS

Figure 1:
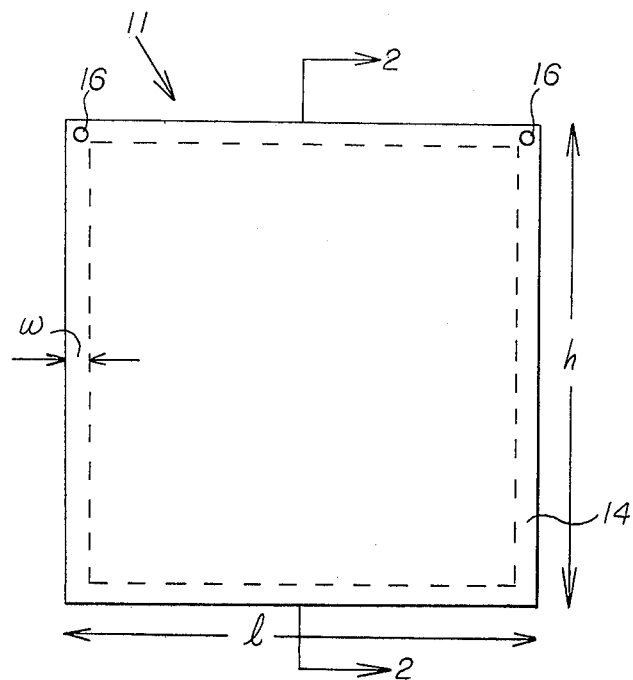
FIG. 1 is a schematic plan view of a thermal energy storage device according to the invention.
Figure 2:
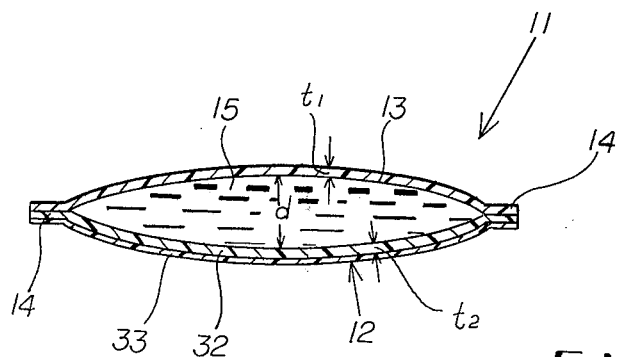
FIG. 2 is a schematic cross-sectional view taken along lines 2—2 of FIG. 1.
Figure 3:
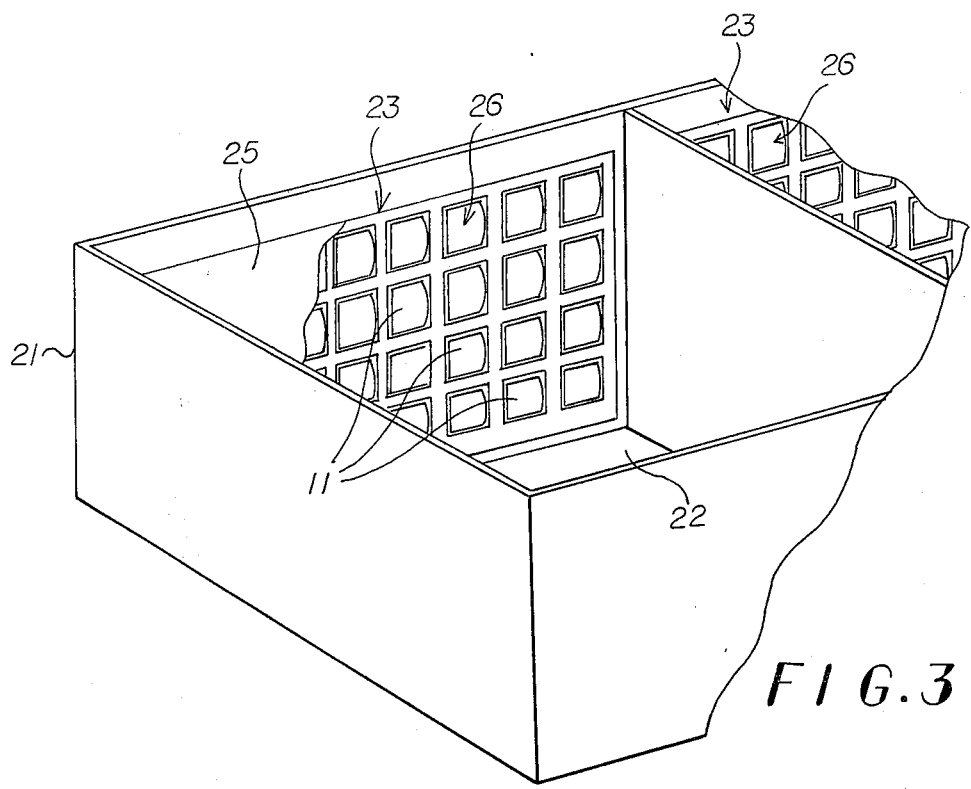
FIG. 3 is a partial schematic isometric view of a building structure employing a thermal energy storage system according to the invention.

Referring now to FIGS. 1 and 2, there is shown a thermal energy storage container device 11 according to the invention. The container unit 11 includes a front wall 12 and a rear wall 13. A peripheral margin of the front wall 12 is sealed to a peripheral margin of the rear wall 13 so as to form for the container 11 a sealed peripheral marginal portion 14. To provide additional strength in certain applications, the seal portion 14 between the front and rear walls 12 and 13 can include a spacer member (not shown). Filling the sealed interior of the container unit 11 is an at least partially light transmissive thermal energy storage substance 15 that preferably experiences a liquid-solid phase change between 45° F. and 190° F. Examples of such substances appear in some of the above-noted U.S. patents and publications and others are disclosed hereinafter. The front and rear walls 12 and 13 are preferably formed by normally flat pieces of rigid plastic material that is deflected apart in a diaphragm action by the filling substance 15. The term "rigid plastic" as used herein is defined in the 1979 Annual Book of ASTM Standards, Part 35, page 389. Also, the front and rear walls 12 and 13 together are preferably partially transmissive of visible light and partially absorptive thereof with a transmittance in the range between 4% and 85% and absorptance of at least 9%. As shown in FIG. 1, the marginal portion 14 possesses openings 16 that can be used to mount the container unit 11 on supporting hooks. Although only a single container unit 11 is illustrated, storage containers comprising a plurality of such units can be formed by providing sealed intermediate ribs between outer sealed edges of a composite device.

In use, the container unit 11 is positioned in a desired location wherein the front wall 12 is exposed to solar energy. Some portion of incident solar radiation is transmitted via the front wall 12, the filling substance 15 and the rear wall 13. However, some proportion of that radiation is also absorbed by the container unit 11. When the substance 15 receives a sufficient quantity of heat either directly as radiant energy or as heat conducted thereto from the radiantly heated container walls 12 and 13, the substance melts and retains the heat in storage. Subsequently, with an ambient temperature below its freezing point, the substance 15 again changes phase to its frozen solid state releasing the stored energy to the surrounding environment.

As shown in FIG. 2, the deflected front and back walls 12 and 13 of the filled container 11 are deflected apart by a maximum distance, d, in a central region of the interior and gradually taper inwardly to the sealed marginal portion 14. According to featured parameters, the area defined by the sealed marginal portion 14 has a square root between 14 and 20 times the maximum distance, d, the contained substance 15 has a storage capacity of between 100 and 2000 Btu's per square foot of the defined area, and the slopes for the inwardly tapered front and rear walls 12 and 13 do not exceed 30 degrees. Other featured parameters include a fiber reinforced, thermoset polyester wall material having a modulus of elasticity in flexure of between $0.75 \times 10^6$ psi and $1.25 \times 10^6$ psi, a maximum deflection distance, d, between the front and rear walls 12 and 13 of between 6 and 30 times the combined thickness $(t_1 + t_2)$ thereof, and a thickness $t_1$, $t_2$ for each of the front and rear walls of between 0.020 and 0.070 inches. All of these parameters establish desired strength and diaphragm capability for the resultant container 11. Wall thicknesses of less than 0.020 inches are susceptible to puncture by crystals of the frozen energy storage substance 15 while wall thicknesses in excess of 0.070 inches are wasteful of material.

The particular container structure illustrated in FIGS. 1 and 2 alleviates thermal inefficiency caused by slow melting and freezing of the substance 15. Slow phase changes in prior systems resulted from container configurations that both produced uneven melting and a tendency for nucleators in the substance 15 to settle to a container bottom and thereby retard freezing. With the container 11, thermal storage material nucleators are trapped between the walls 12 and 13 in the narrowest regions near the marginal portions 14. Therefore, the thermal storage material 15 begins freezing at these narrow sections around the entire periphery of the container 11. These numerous nucleator sites reduce the maximum distance the solid must form to begin solidifying liquid at the top of the container 11. Keeping that distance small minimizes supercooling of the thermal storage substance 15, thus increasing heat transfer out of the container 11. In addition, the gently sloping tapered walls 12 and 13 of the container 11 produce a melting process which is uniform and rapid. The thermal storage substance 15 first melts completely at the narrow regions adjacent the marginal portions 14. Gradually the solid is melted entirely at progressively thicker sections. This even and gradual melting process diminishes the path length of thermal convective currents which are needed to completely melt the thermal storage material 15, thus speeding the melting process.

Following are parameters and materials used for a specific container unit 11 constructed according to the invention: (It is to be noted that certain dimensions in the Figs. are distorted in the interest of clarity.)

Figure 4:
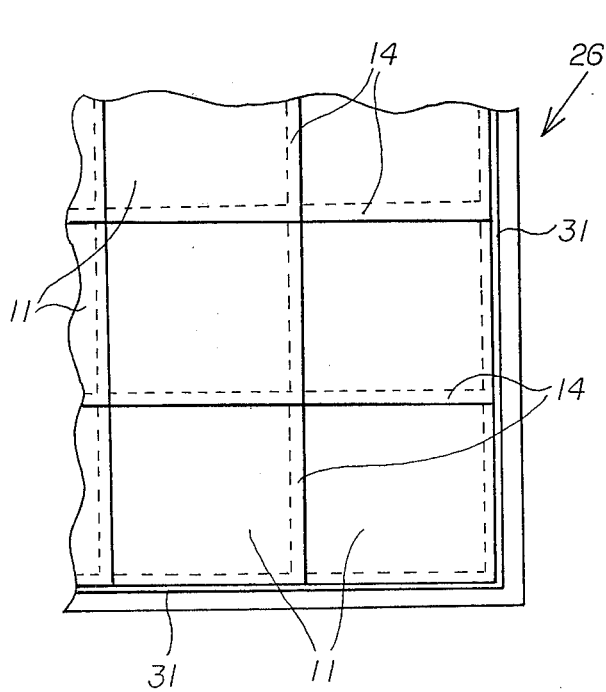
FIG. 4 is a schematic partial front view of the storage system shown in FIG. 3.
Figure 5:
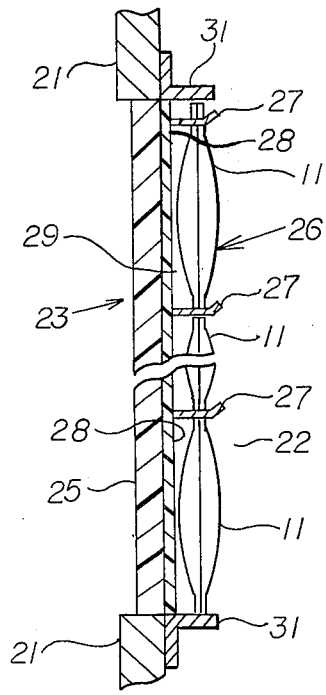
FIG. 5 is a schematic cross-sectional view through the storage system shown in FIG. 3.
Figure 6:
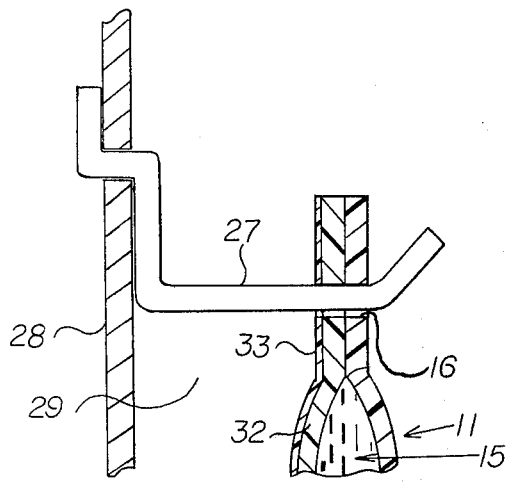
FIG. 6 is a schematic detailed view of a support mechanism utilized for the storage system of FIGS. 3-5.

Container Walls 12 and 13
  Material: Glass-fiber reinforced thermoset polyester
  Thickness: $t_1 = t_2 = 0.060$ inches
  Light Transmittance: 55%
  Light Absorptance: 35%
  Modulus of elasticity in flexure (flexural modulus): $1 \times 10^6$ psi
Container Dimensions
  Thickness (d) = 2 inches
  Height (h) = 22 inches
  Length (l) = $22\frac{3}{8}$ inches
  Margin Width (w) = $\frac{3}{4}$ inch
Adhesive For Sealed Margins 14
  Epoxy
Thermal Storage Material 15
  A calcium chloride hexahydrate and $BaOH-8H_2O$ nucleator Referring now to FIGS. 3-6, there is shown a partial isometric view of a building structure 21 enclosing an interior space 22 and equipped with solar energy storage systems 23 according to the invention. Each system 23 comprises a glazing portion 25 of the building structure 21 and a solar energy storage wall 26 disposed adjacent thereto. The energy storage walls 26 include stationary arrays of modular, thermal energy storing container units 11 of the type described above and shown in FIGS. 1 and 2. Supporting the individual container units 11 are hooks 27 (FIG. 6) that extend through the marginal openings 16. The hooks 27 are mounted on vertical, spaced apart battens 28 located directly adjacent to the glazing 25. As shown in FIG. 5, an array 26 is coextensive with a glazing portion 25 and spaced slightly therefrom so as to form an intermediate space 29 therebetween. As also shown in FIGS. 4 and 5, the marginal portions 14 of adjacent individual container units 11 are overlapped so as to seal and isolate the intermediate space 29 from the interior space 22 of the building structure 21. Additional isolation is provided by brackets 31 that extend around the perimeter of each array 26.

The individual container units 11 function in the manner described above to sequentially and alternatively store solar energy received through the glazing portions 25 and subsequently release that stored energy by convection and radiation to the air and objects within the interior space 22. In this way the fossil fuel heating requirements of the building 21 are significantly reduced. Furthermore, because of the at least partial transparency of the individual container units 11, the interior space 22 receives some of the light available at the outer surface of the glazing portions 25. For this reason the requirements for artificial lighting within the interior space 22 also are reduced. Another advantage is that a stationary array 26 of modular, individually detachable thermal energy storage units 11 can be inexpensively and easily assembled in varying and intricate configurations. Also, defective individual storage units can be easily replaced to restore maximum efficiency of the storage system.

The overall thermal efficiency of the system 23 is enhanced by the dead air space provided by the intermediate region 29. That space 29 establishes a thermal gradient that reduces convection heat loss from the interior space 22 through the glazing 25. Additional efficiency can be obtained by an embodiment wherein the front walls 12 of the container units 11 are more absorbent of radiant energy than are the rear walls 13. In this way reflective losses through the front wall 12 can be minimized for a container 11 with a given overall ratio between transmission and absorption. As shown in FIG. 2, this embodiment can be provided by forming the front wall 12 from a rigid plastic substrate 32 and an absorbent coating 33 of, for example, a pigmented or dyed acrylic polymer. The coating 33 can be selected so as to provide a given container unit 11 with the desired overall transmission characteristics. It will be appreciated, however, that a similar result can be obtained by the appropriate addition of dyes to the plastic walls 13 and 32. This embodiment offers the further advantage in certain applications of rendering more visible to individuals within the interior space 22 the esthetically pleasing intricate variations in the crystalline structure of the substance 15. In addition, the greater transparency of the rear wall 13 can facilitate monitoring of the effectiveness of the phase-change substance 15 within each of the container units 11.

Figure 8:
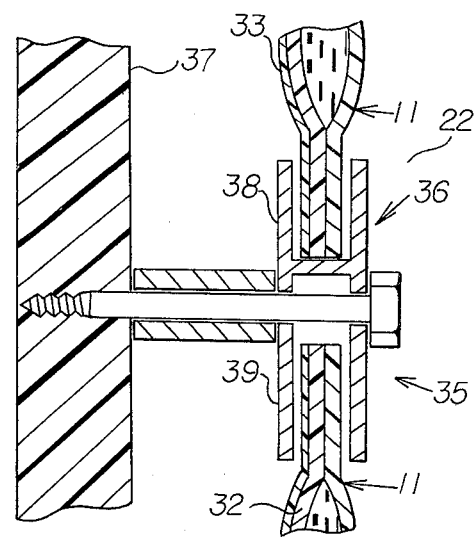
FIG. 8 is a schematic cross-sectional view taken along lines 8—8 of FIG. 7.
Figure 7:
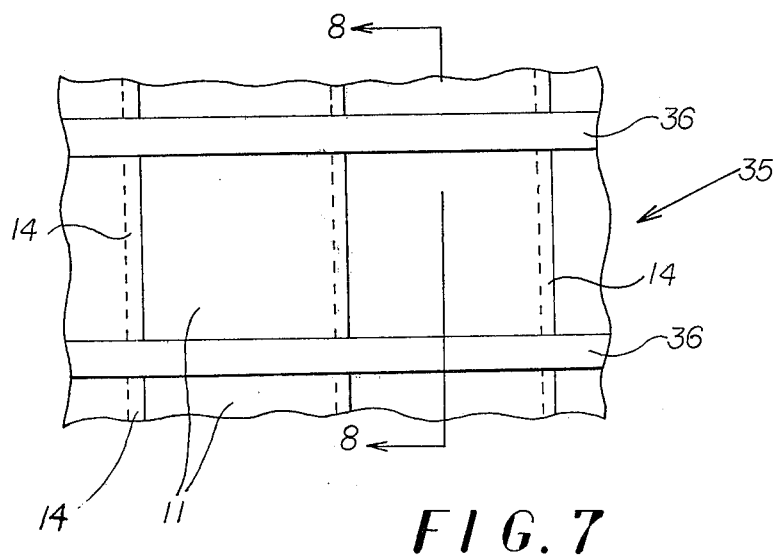
FIG. 7 is a schematic front view of another storage system embodiment of the invention.

Referring now to FIGS. 7 and 8, there is shown another thermal energy storage system 35 according to the invention. Again, the system comprises an array of the above-described container units 11. Support in this embodiment is provided by a plurality of H-shaped support members 36 that are fixed to and spaced from vertical battens 37. The elongated support members 36 extend horizontally and are vertically spaced apart. The lower edges of a plurality of overlapped containers 11 are supported by the upwardly facing channel 38 of each member 36. Retaining the upper edges of the containers 11 is the downwardly facing channel 39 of the member located directly above. Although utilizing a different support structure, the thermal energy storage system 35 functions in the same manner as the storage system 26 described above.

Obviously, many modifications and variations of the present invention are possible in light of the above teachings. It is to be understood, therefore, that the invention can be practiced otherwise than as specifically described.

What is claimed is:

1. A thermal energy storage unit comprising:
   a sealed container comprising a front wall portion and a rear wall portion, said front and rear wall portions together being partially absorptive and partially transmissive of visible light with a transmittance of between 4% and 85% and an absorptance of at least 9%; and
   a thermal energy storage substance retained by said container between said front and rear wall portions, said energy storage substance being at least partially transmissive of visible light and experiencing a liquid-solid phase change at a predetermined temperature condition between 45° F. and 190° F.

2. A unit according to claim 1 wherein the thermal storage capacity of said substance is between 100 and 2000 Btu per square foot of each of said front and rear wall portions.

3. A unit according to claim 1 wherein the visible light transmittance of said rear wall portion is greater than that of said front wall portion.

4. A unit according to claim 1 wherein said front wall portion comprises a plastic substrate having a given visible light transmittance, and a light absorptive coating having a lesser visible light transmittance.

5. A unit according to claim 1 wherein said substance is inorganic.

6. A thermal energy storage unit comprising:
   a container having front and rear walls formed of a rigid self-supporting plastic material, said front wall having a peripheral marginal portion sealed to a peripheral marginal portion of said rear wall so as to provide said container with a sealed interior, wherein said front and said rear walls together are partially absorptive and partially transmissive of visible light with a transmittance of between 4% and 85% and an absorptance of at least 9%, and said plastic material having a modulus of elasticity in flexure of between $0.75 \times 10^6$ psi and $1.25 \times 10^6$ psi; and
   a thermal energy storage substance substantially filling said interior and deflecting said front and rear walls outwardly in a diaphragm action, said storage substance experiencing a liquid-solid phase change at a predetermined temperature condition between 45° F. and 190° F. without external influences other than temperature.

7. A device according to claim 6 wherein said front and rear walls are spaced apart by a maximum distance in a central region of said interior and gradually taper inwardly to said sealed marginal portions.

8. A device according to claim 7 wherein the square root of the area defined by said sealed together marginal portions is between 14 and 20 times said maximum distance.

9. A device according to claim 7 wherein the slopes of said inwardly tapered front and rear walls do not exceed 30°.

10. A device according to claim 7 wherein said maximum distance is between 6 and 30 times greater than the combined thickness of said front and rear walls.

11. A device according to claim 7 wherein the thermal storage capacity of said substance is between 100 and 2000 Btu's per square foot of the area enclosed by said sealed marginal portions.

12. A device according to claim 7 wherein said rear wall has a visible light transmittance that is less than that of said front wall.

13. A device according to claim 7 wherein said front wall comprises a plastic substrate having a given visible light transmittance, and a light absorptive coating having a lesser visible light transmittance.

14. A device according to claim 7 wherein said marginal portions possess openings adapted to receive hook support means.

15. A device according to claim 7 wherein said plastic material is a fiber-reinforced thermoset polymer.

16. A device according to claim 15 wherein each of said front and rear walls have a thickness in a range between 0.020 and 0.070 inches.

17. A thermal energy storage system comprising:
   an enclosure defining an interior space and comprising a glazing portion transmissive of solar energy; and
   an array of modular, individually detachable units positioned between said glazing portion and said interior space, each of said container units being filled with an energy storage substance experiencing a liquid-solid phase change at a predetermined temperature condition between 45° F. and 190° F. and having a front wall facing said glazing portion and a rear wall facing said interior space, and wherein said energy storage substance is at least partially transmissive of visible light and each of said containers is partially absorptive and partially transmissive of visible light with a transmittance of between 4% and 85% and an absorptance of at least 9%.

18. A system according to claim 17 wherein said array is coextensive with said glazing portion and positioned so as to form therewith a closed intermediate space isolated from said interior space.

19. A system according to claim 17 wherein said container means is coextensive with said glazing portion and positioned so as to form therewith a closed intermediate space isolated from said interior space.

20. A system according to claim 17 wherein each of said front and rear walls is formed of a rigid plastic material and said front wall has a peripheral marginal portion sealed to a peripheral marginal portion of said rear wall so as to provide said container with a sealed interior.

21. A system according to claim 20 wherein said front and rear walls are spaced apart by a maximum distance in a central region of said interior and gradually taper inwardly to said sealed marginal portions.

22. A system according to claim 21 wherein the square root of the area defined by said sealed together marginal portions is between 14 and 20 times said maximum distance.

23. A system according to claim 21 wherein the slope of said inwardly tapered front and rear walls does not exceed 30°.

24. A system according to claim 21 wherein said front and said rear walls together are partially absorptive and partially transmissive of visible light with a transmittance of between 4% and 85% and an absorptance of at least 9%.

25. A system according to claim 21 wherein said plastic material has a modulus of elasticity in flexure of between $0.75 \times 10^6$ psi and $1.25 \times 10^6$ psi.

26. A system according to claim 21 wherein said maximum distance is between 6 and 30 times greater than the combined thickness of said front and rear walls.

27. A system according to claim 21 wherein the thermal storage capacity of said substance is between 100 and 2000 Btu per square foot of the area enclosed by all of said sealed marginal portions.

28. A system according to claim 17 wherein the visible light transmittance of said rear wall is greater than that of said front wall.

29. A system according to claim 28 wherein said front wall comprises a plastic substrate having a given visible light transmittance, and a light absorptive coating having a lesser visible light transmittance.

30. A system according to claim 20 wherein said plastic material is a fiber-reinforced thermoset polymer.

31. A system according to claim 30 wherein each of said front and rear walls have a thickness in a range between 0.020 and 0.070 inches.

32. A system according to claim 21 wherein said marginal portions of said individual units overlap said marginal portions of adjacent units so as to create seals that isolate said interior space from said intermediate space.

33. A system according to claim 21 wherein said array is stationary.

34. A system according to claim 32 wherein said marginal portions on said units possess attachment openings, and said array further comprises hook support means and a plurality of hooks retained by said support means and received by said openings so as to detachably fix said units to said support means.

35. A system according to claim 17 wherein said storage substance inherently experiences said phase change without external influences other than temperature.

36. A system according to claim 17 including support means supporting said array, said support means comprising spaced apart support members that retain opposite edges of said units.

37. A system according to claim 36 wherein said support members comprise channels that receive said opposite edges of said units.

* * * * *